United States Patent [19]

Witte et al.

[11] Patent Number: 4,514,849
[45] Date of Patent: Apr. 30, 1985

[54] DYE LASER WITH ROTATING WEDGE ALIGNMENT SERVO

[75] Inventors: Kenneth G. Witte, Mountain View; Thomas F. Johnston, Jr., Sunnyvale, both of Calif.

[73] Assignee: Coherent, Inc., Palo Alto, Calif.

[21] Appl. No.: 529,979

[22] Filed: Sep. 7, 1983

[51] Int. Cl.³ .............................................. H01S 3/13
[52] U.S. Cl. .................................... 372/29; 372/107; 372/98; 372/26; 372/76; 372/38; 372/54
[58] Field of Search ...................... 372/70, 10, 14–16, 372/26, 29, 54, 98, 107, 99, 20, 38

[56] References Cited

PUBLICATIONS

Winter et al., "An Improved Reference Interferometer Incorporating an Angular Positioning Servo, Used to Tune a Narrow Band Width Optical Filter"; J. Phys. E: Sci. Inst. vol. 14, p. 439, 1981.

Primary Examiner—William L. Sikes
Assistant Examiner—Léon Scott, Jr.
Attorney, Agent, or Firm—J. William Wigert, Jr.

[57] ABSTRACT

A laser-pumped laser system is disclosed, such as a dye laser which is optically pumped by an argon ion laser. An improved servo system is provided for maintaining relative alignment of the pump laser beam with respect to the dye laser cavity. This is accomplished by rotating the pump beam such that the beam defines a conical surface, by means such as an optically-transmissive rotating wedge. Such rotation provides dithering along two orthogonal axes, which provides the necessary control information to maintain pump beam alignment.

11 Claims, 4 Drawing Figures

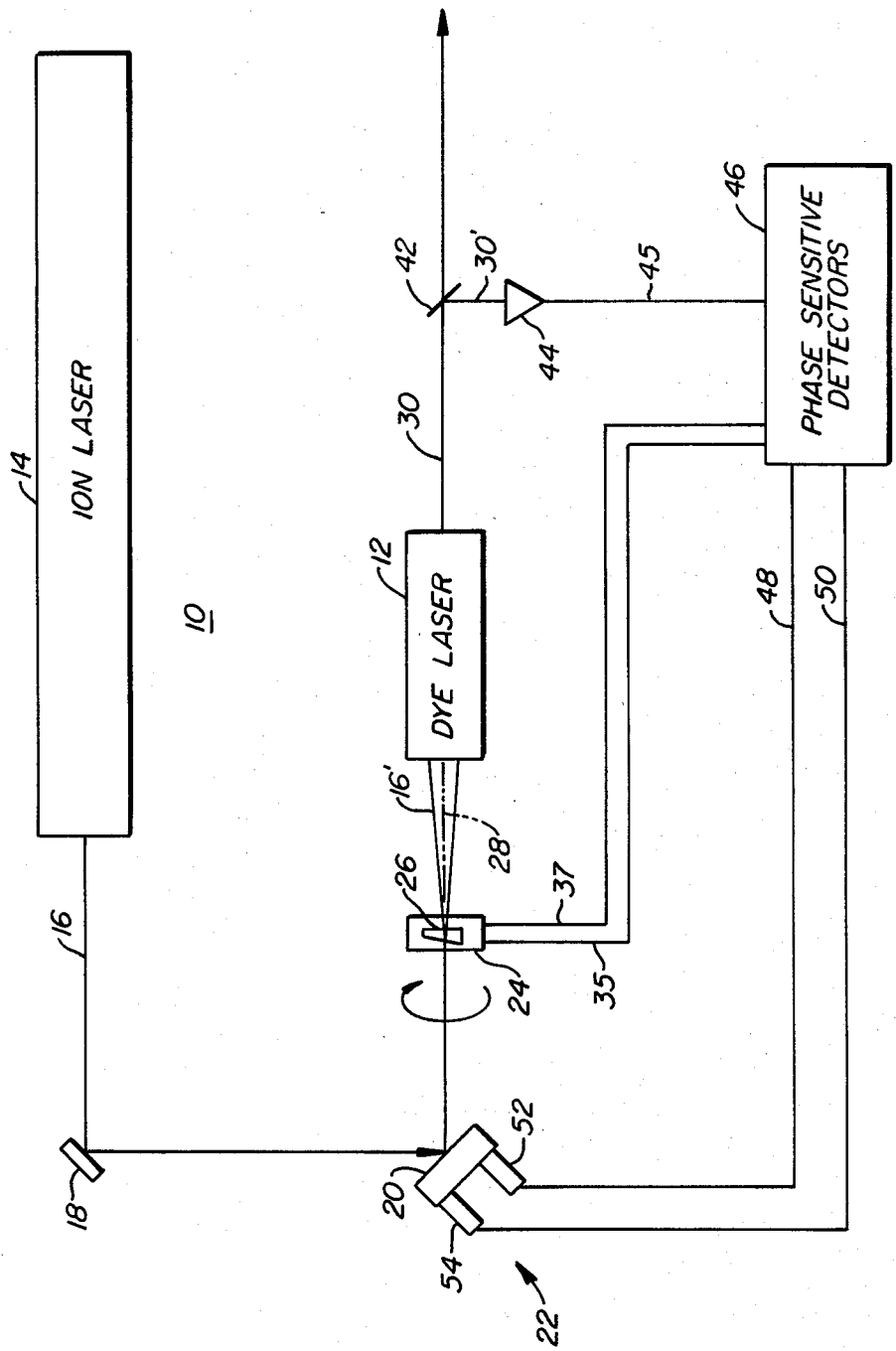
FIG._1.

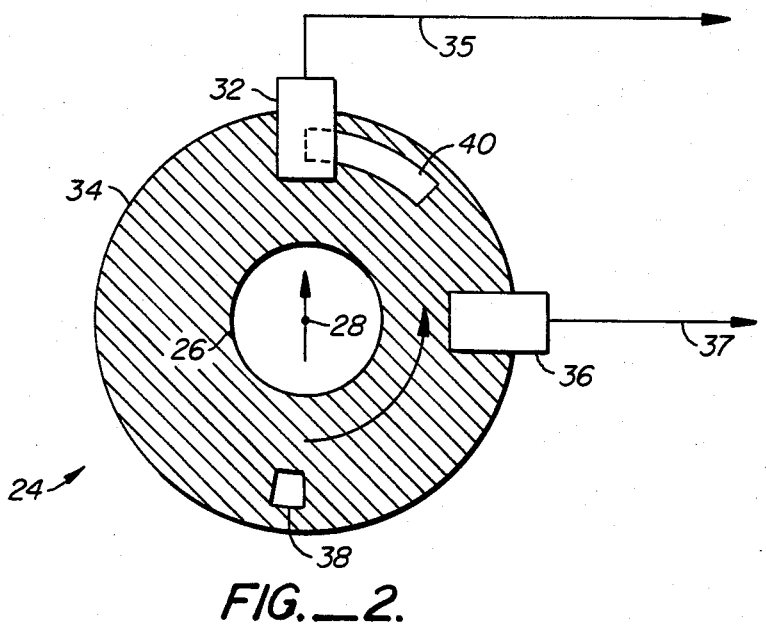
FIG._2.
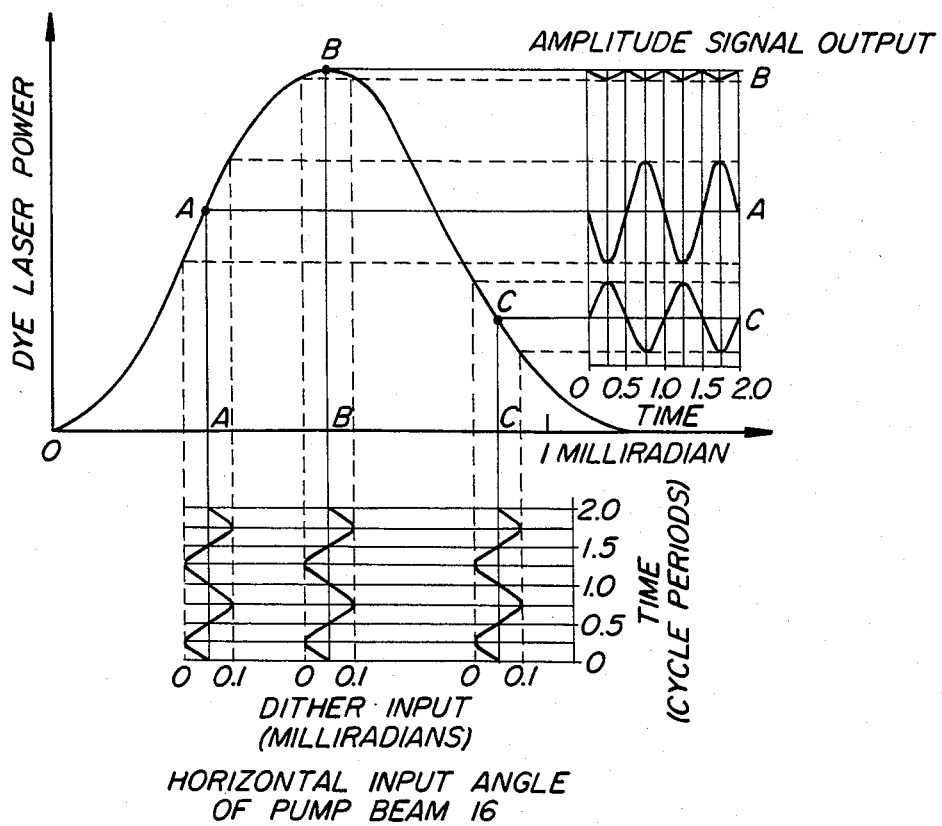
FIG._4.

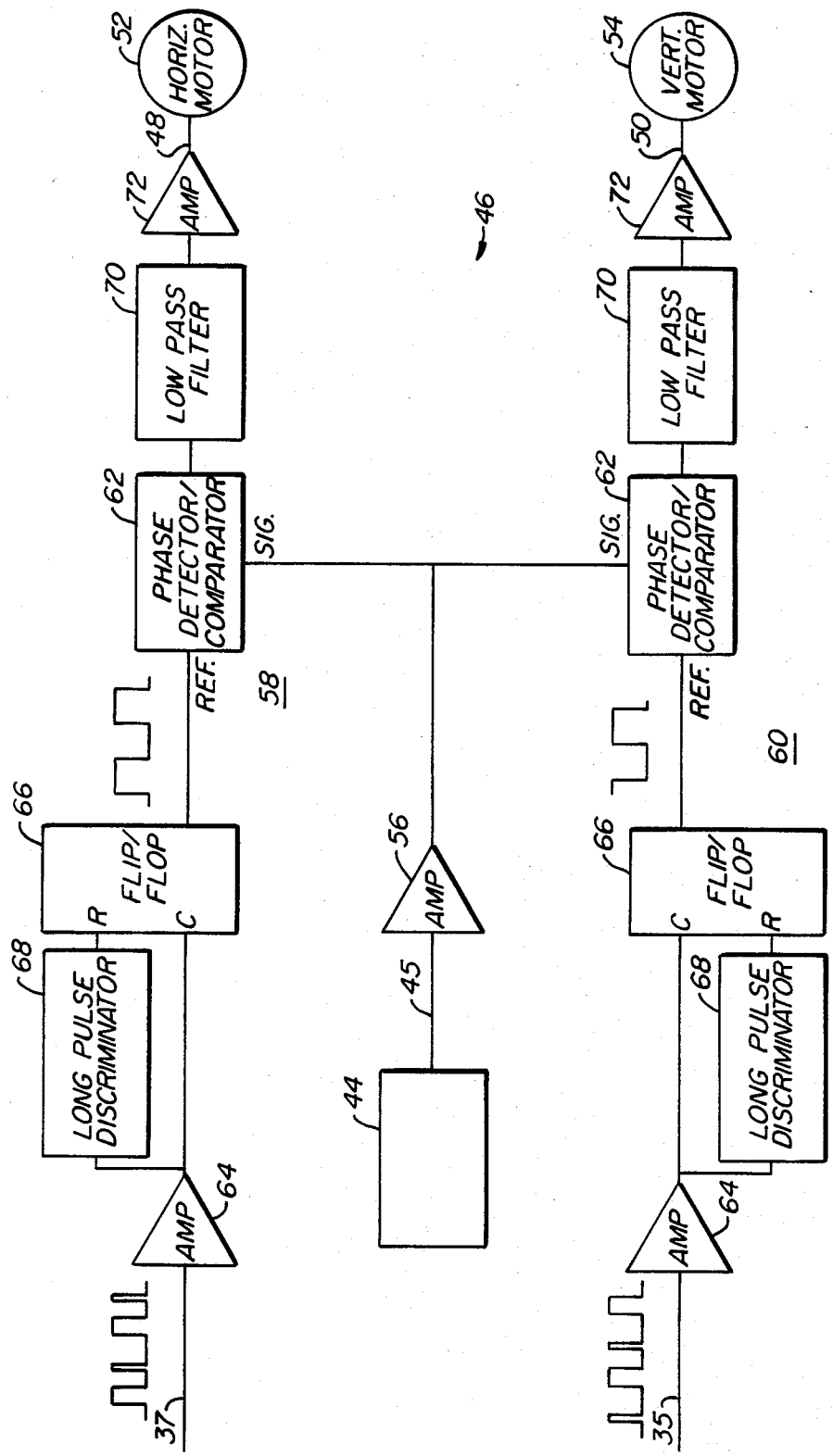
FIG._3.

DYE LASER WITH ROTATING WEDGE ALIGNMENT SERVO

DESCRIPTION

1. Technical Field

This invention relates to laser-pumped laser systems and in particular to a dye laser system having improved coupling between the pump laser source and the dye laser.

2. Backgound Art

Dye laser systems for OEM applications such as medical treatment systems and light shows have unique requirements compared with scientific dye laser systems. These systems must be compact and capable of stable, hands-off, remote operation. Generally, two requirements are necessary to obtain stable, long-term dye laser output over a wide range of input power. First, the relative alignment between the optical pump and dye laser must be maintained in order to insure optimal coupling of the pump laser power into the dye. Secondly, the pump laser output power must be actively controlled to hold the dye laser power constant. This dye laser power stabilization loop will not work unless the relative alignment between the two lasers is independently maintained.

One way to satisfy the relative alignment requirement is to design the pump and dye lasers such that they are in-line and share a common optical resonator. However, systems of this type are too large for most OEM applications. A folded beam geometry, where the pump laser beam is folded into the dye laser such that the beam path forms a "U", is the preferred way to configure a compact dye laser system. Heretofore, a costly temperature-compensated mechanical assembly has been used to maintain the relative alignment for the folded beam geometry.

An alignment servo would eliminate this requirement by providing a system which actively maintains the relative alignment between the pump and dye lasers which do not share a common optical resonator structure. One approach to providing such an alignment servo system is to use a mirror with 2 degrees of rotational freedom driven by PZTs to produce dither of the pump laser source along two, orthogonal axes. A "dither" is an oscillatory input having low signal amplitude which is introduced in a system, such as a dye laser system, to provide small perturbations in the dye laser output. These small perturbations are then utilized by a suitable control system to realign the focal spot of the pump laser source with respect to the focal spot of the dye laser cavity in the dye stream to maximize the dye laser output.

However, a PZT-driven mirror assembly has several serious disadvantages. First, the dither amplitude is limited by the small extensions of the PZTs. Secondly, high voltage electronics are required to drive the PZTs. Third, comparatively expensive oscillators are required to drive the PZTs and generate reference signals. Fourth, cross-coupling between the two dither axes is complicated to eliminate.

DISCLOSURE OF THE INVENTION

In accordance with the present invention, improved coupling of the pump laser and a dye laser is achieved by means of an improved servo system for maintaining relative alignment of the pump laser beam and the dye laser. More particularly, means is provided for rotating the pump laser beam such that the beam defines a conical surface and the end point of the beam on the flat dye stream follows a circular or elliptical path, depending upon the inclination of the dye stream.

The circular motion of the beam on the dye causes small perturbations in the output power of the dye laser beam. These perturbations can be resolved in orthogonal components, such as horizontal and vertical components. Adjustments of the aligment of the pump laser beam on the dye laser dye are then automatically made to maximize the dye laser output.

In the preferred embodiment, rotation of the pump laser beam is accomplished by use of a rotating optically-transmissive wedge. By passing the pump beam through and colinearly with the axis of the rotating wedge, the pump beam is projected so as to define a cone shape. The circular path defined by the rotated pump beam effectively provides dithering in mutually orthogonal axes. This approach has significant advantages over the use of individual PZT-driven mirrors to provide vertical and horizontal dithering.

First, the amount of dither is unlimited. The geometry of the rotating wedge can be varied to provide the amount of desired dither. Secondly, the necessity of high voltage electronics required by PZTs is eliminated. Low voltage electronics are used. Third, the oscillators and reference signal generators required by PZTs are eliminated. The dither frequency is determined by the speed of the rotating wedge and the required reference signals are generated by simple optical pickoffs on the rotating wedge assembly. Finally, cross talk between the dither axis is automatically eliminated. In PZT systems, this requires a complex mechanical system to hold the dither mirror.

DESCRIPTION OF THE DRAWINGS

FIG. 1 is a block schematic diagram of a dye laser system with the improved pump laser beam alignment servo system of the present invention.

FIG. 2 is detailed view of the rotating optical wedge assembly of the servo system of FIG. 1.

FIG. 3 is a detailed block diagram of the phase sensitive detectors of FIG. 1.

FIG. 4 is a graphical representation of the dye laser output as a function of the pump laser beam alignment relative to the dye cavity, along a single axis.

DETAILED DESCRIPTION OF THE INVENTION

FIG. 1 is a block diagram showing a dye laser system 10 which includes a dye laser 12 and a pump laser 14, which typically is an argon ion laser. The output beam 16 from the pump laser 14 is introduced within the dye laser 12 by means of a U-shaped geometry including folding mirror 18 and a positioning mirror 20 within a mirror mount assembly 22. The pump laser beam 16 impinges upon dye laser 12 dye (not shown), typically a ribbon of flowing liquid dye, in the conventional manner.

Prior to impinging upon the dye laser 12 dye stream, the pump beam 16 passes through a rotating wedge assembly 24, shown in greater detail in FIG. 2, which includes an optically transmissive optical wedge 26 which rotates about an axis 28 colinear with the pump laser beam 16. The resulting pump laser beam 16, after it passes through the rotating wedge 26, emerges as a pencil of light 16' which slides (revolves) about the surface of a cone at the rotational frequency of the wedge 26. The full angle of the cone is twice the deviation angle of the optical wedge 26. This circular motion (highly exaggerated in FIG. 1) is equivalent to equal amplitude dithers of the pump beam 16' along two orthogonal directions—such as in the horizontal and vertical directions. This results in small amplitude modulation of the dye laser 12 output beam 30 due to the horizontal and vertical angle misalignment of the ion laser beam 16'.

Referring to FIG. 2, a first optical detector or pickoff 32 is located at the top of a doughnut-shaped wheel 34, which supports the optical wedge 26 in assembly 24. Pickoff 32 provides the vertical reference signal 35. A second optical pickoff 36 is located in the horizontal position, 90° from optical pickup 32, providing a horizontal reference signal 37. Wheel 34 has two slots in it which are aligned with the optical pickoffs 32 and 36, a short slot 38 and long slot 40, whose leading edges are 180° out of phase with each other. When the long slot 40 is aligned with either optical pickoff 32 or 36 long or wide electrical pulses are provided. When the short slot 38 is so aligned, short or narrow electrical pulses are provided.

The leading edges of the long and short slots 38 and 40 are aligned with the orientation of the optical wedge 26. That is, one is located at the thickest side of the wedge and the other at the thinnest side. This insures proper phasing of the vertical and horizontal reference signals 35 and 37.

A beam splitter 42 provides a sample 30' of the dye laser output beam 30 to a detector which provides a signal 45 representative of the amplitude of dye laser beam 30 to phase sensitive detectors 46. Using reference signals 35 and 37 and amplitude signal 45 the phase sensitive detectors 46 separate the horizontal and vertical misalignment information and provide horizontal and vertical drive signals 48 and 50, to the mirror mount assembly 22, in a manner which is explained subsequently. The mirror 20 of this assembly is supported on a 2-axis mount, which is movably driven about a horizontal axis by a horizontal drive motor 52 and about a vertical axis by a vertical drive motor 54. Drive signals 48 and 50 cause drive motors 52 and 54 to move mirror 20, with a response time which is slow compared to a dither period, to correct the average misalignment and maximize dye laser 12 output power.

As shown in FIG. 3 the vertical and horizontal reference signals 35 and 37 are a series of alternating wide and narrow pulses due to the two slots 40 and 38. The horizontal and vertical reference signals are, of course, 90° out of phase with each other.

The dye laser amplitude signal 45 is sent via amplifier 56 to the horizontal channel 58 and the vertical channel 60 of the phase sensitive detectors 46. Since the horizontal and vertical channels 58 and 60 are identical, only the horizontal channel 58 is described and identical reference numerals are used for identical components of the two sections.

Specifically, the amplified dye laser amplitude signal 45 is sent to a phase detector/comparator 62, where it is compared with a square wave reference signal 37—which is provided as follows. The horizontal reference signal 37 is sent to an amplifier 64 where the signal is amplified and then sent to the clock gate, C, of a flipflop 66. The flip/flop 66 changes its output state each time it is provided either a long or short pulse. In order to provide proper reference signals relative to rotating wedge 26 orientation to the phase detector/comparator 62, flip/flop 66 goes low each time a wide pulse is inputed and goes high each time a short pulse is inputed. This is accomplished by a long pulse discriminator circuit 68 which, in response to each long pulse, resets flip/flop 66 to the low state. This eliminates any reference signal phase ambiguities at startup or which are caused by noise or loss of a pulse or pulses.

Phase detector/comparator 62 compares the phase angle of the square wave derived from the reference signal 37 with that of the dithered dye laser amplitude signal 45 and provides an error signal to low pass filter 70, which separates out the d.c. component of the error signal. In turn this signal is amplified at 72 and provides the horizontal drive signal to the horizontal motor 52 to correct the pump laser beam misalignment along the horizontal axis.

In the vertical channel 60, the same process takes place except that the output from flip/flop 66 is 90° out of phase with that from flip/flop 66 in the horizontal channel 58. The output from amplifier 72 provides the vertical motor drive signal 50 to vertical motor 54. The horizontal and vertical channels are independent because the phase detectors/comparators 62 are insensitive to signals which are 90° out of phase with their reference signal.

The operation of phase sensitive detectors 46 can be understood by reference to FIG. 4, which shows the dye laser output power as a function of the horizontal input angle of the pump laser beam. For purposes of explanation, only the horizontal input angle will be examined, but it should be understood that the operation of the vertical component is identical. The horizontal dither component of the rotating wedge 24 causes an a.c. modulation of the horizontal input angle of the pump beam 16. The resulting intensity modulation of the dye laser 12 depends upon the horizontal input angle of pump beam 16 as illustrated in FIG. 4. The following occurs:

(1) The a.c. intensity modulation of the dye laser 12 beam 30 is at the same frequency as the pump beam 16 angle dither and its amplitude is proportional to the product of the dither amplitude and the slope of the dye laser power curve at the operating point.

(2) The phase of the intensity modulation also depends on the operating point. As illustrated, the signals at A and point C are approximately 180° with respect to each other.

(3) At the peak of the intensity curve, the a.c. signal is at two times the dither frequency and its amplitude is at a minimum.

The phase detector/comparator 62 compares the phase of the a.c. intensity signal 45 with the horizontal reference signal 37 in order to determine which direction to drive the horizontal motor 52. If the a.c. intensity signal 45 leads the reference signal, the horizontal motor 52 is driven in one direction. If it lags, the motor 52 is driven in the opposite direction. This forces the motor to be driven to the point where the phase relation makes the transition from lead to lag. From FIG. 4, this point is the maximum power point B.

In one actual embodiment the rotating wedge 26 is a 1″ diameter piece of silica approximately 0.4″ thick with one face at an angle of 150 microradians relative to the other. The rotational speed of the wedge 26 is 50 Hz.

While a light-transmissive wedge 26 has been used to rotate the pump laser beam 16, it should be understood that other optical components could be used to accomplish this, such as a rotating reflector. Additionally the folded pump laser beam geometry shown in FIG. 4 is not required. For example, the rotating wedge assembly 24 could be placed between the pump laser 14 and the dye laser 12 in an in-line system and the dye laser pump mirror translator driven to maintain alignment.

While the preferred embodiment herein described is that of a dye laser system, it should be understood that the pump laser alignment servo of the present invention is applicable to other laser-pumped laser systems, such as an F-center laser system.

We claim:

1. A laser system including an optically pumped laser, a pumping laser for optically exciting the optically pumped laser, and optical means for coupling the output beam from the pump laser with the optically pumped laser and wherein the improvement comprises: means for maintaining relative alignment between the output beam of the pump laser and the optically pumped laser to maximize the output power thereof comprising:
   means for positioning the pump laser beam relative to said optically pumped laser cavity;
   means for rotating the pump laser beam such that the beam defines the surface of a cone;
   means for sensing the output power of the optically pumped laser;
   means for resolving modulations in the output power of the optically pumped laser attributable to the orthogonal components of said pump laser beam for determining the misalignment of the two orthogonal components of the pump laser beam, in response to said output power sensing means; and
   means for activating said pump laser beam positioning means to maximize the optically pumped laser output, in response to said modulations resolving means.

2. A laser system as in claim 1 wherein said rotating means comprises an optically transmissive wedge rotated about an axis aligned with said pump laser beam.

3. A laser system as in claim 2 wherein said optically pumped laser is a dye laser and wherein the path of the pump laser beam impinging on the dye laser stream is circular or elliptical.

4. A laser system as in claim 3 wherein said pump laser is an argon ion laser.

5. A laser system as in claim 2 wherein said two orthogonal components comprise horizontal and vertical components.

6. A laser system as in claim 2 wherein said rotating means additionally includes for providing reference signals to said modulations resolving means indicative of the position of said rotating wedge.

7. A laser system comprising:
   an optically pumped laser;
   a pump laser;
   an optical delivery system for directing said pump laser beam to said optically pumped laser and including a 2-axis movable mirror assembly for adjusting the position of said pump beam relative to said optically pumped laser;
   means for dithering said pump laser beam along orthogonal axes by rotating said pump laser beam such that the beam defines the surface of a cone;
   means for sensing the output of said optically pumped laser and modulations thereto; and
   means responsive to said sensing means for determining the phase angle of said optically pumped laser output modulations for each of the orthogonal axes and for providing signals to said movable mirror assembly to re-align said pump laser beam in response to pump beam misalignment.

8. A laser system as in claim 7 wherein said dithering means comprises a rotating light-transmissive wedge assembly.

9. A laser system as in claim 8 wherein said light-transmissive wedge assembly includes means for providing reference signals to said phase angle and amplitude determining means indicative of the position of said light-transmissive wedge relative to said orthogonal axes.

10. A laser system as in claim 9 wherein said reference signal means comprises;
    a wheel supporting said wedge;
    a long slot and a narrow slot in said wheel; one slot being oriented 180° relative to each other and in a defined position relative to said wedge; and
    a pair of orthogonally oriented optical pickoffs for sensing said long and narrow slots.

11. A laser system as in claim 7 wherein said optically pumped laser is a dye laser.

* * * * *